(No Model.) 3 Sheets—Sheet 1.

G. SLUDER, G. CAMPBELL, Jr. & G. D. BROWN.
LIQUEFIED GAS BRAKE.

No. 568,214. Patented Sept. 22, 1896.

Witnesses
W. G. Alexander
E. E. Vernell

Inventors
Geo. D. Brown
Given Campbell Jr.
Greenfield Sluder
By Attorneys
Fowler & Fowler (No Model.) 3 Sheets—Sheet 2.
G. SLUDER, G. CAMPBELL, Jr. & G. D. BROWN.
LIQUEFIED GAS BRAKE.
No. 568,214. Patented Sept. 22, 1896.
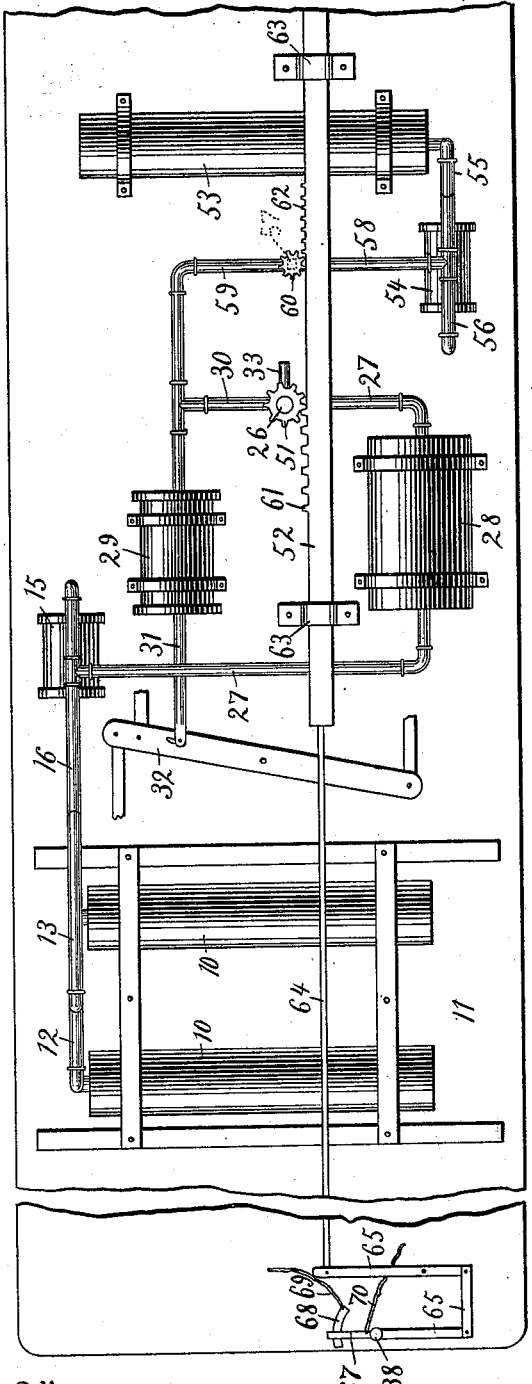
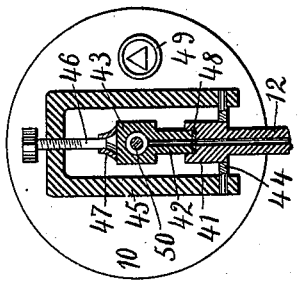
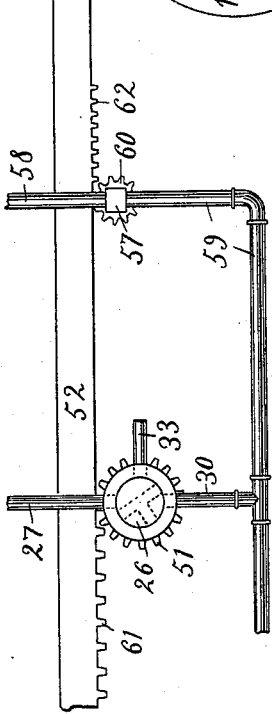
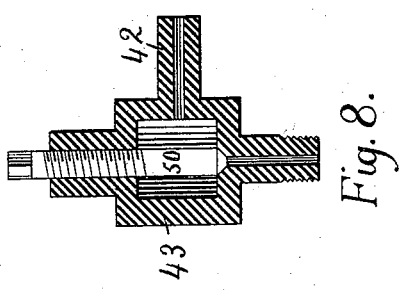
Witnesses
Inventors
By Attorneys (No Model.) 3 Sheets—Sheet 3.
G. SLUDER, G. CAMPBELL, Jr. & G. D. BROWN.
LIQUEFIED GAS BRAKE.
No. 568,214. Patented Sept. 22, 1896.
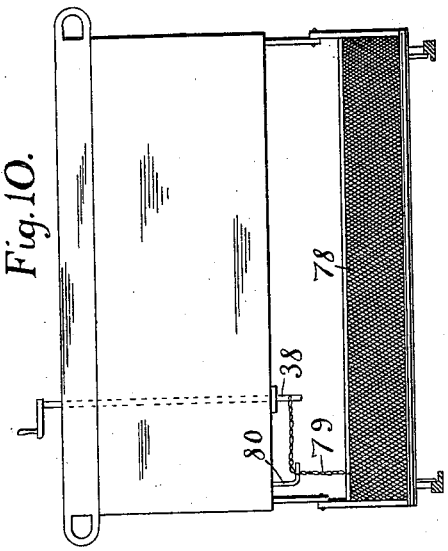
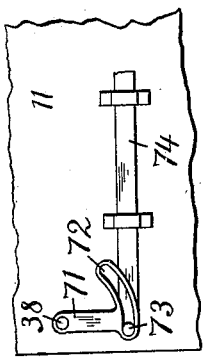
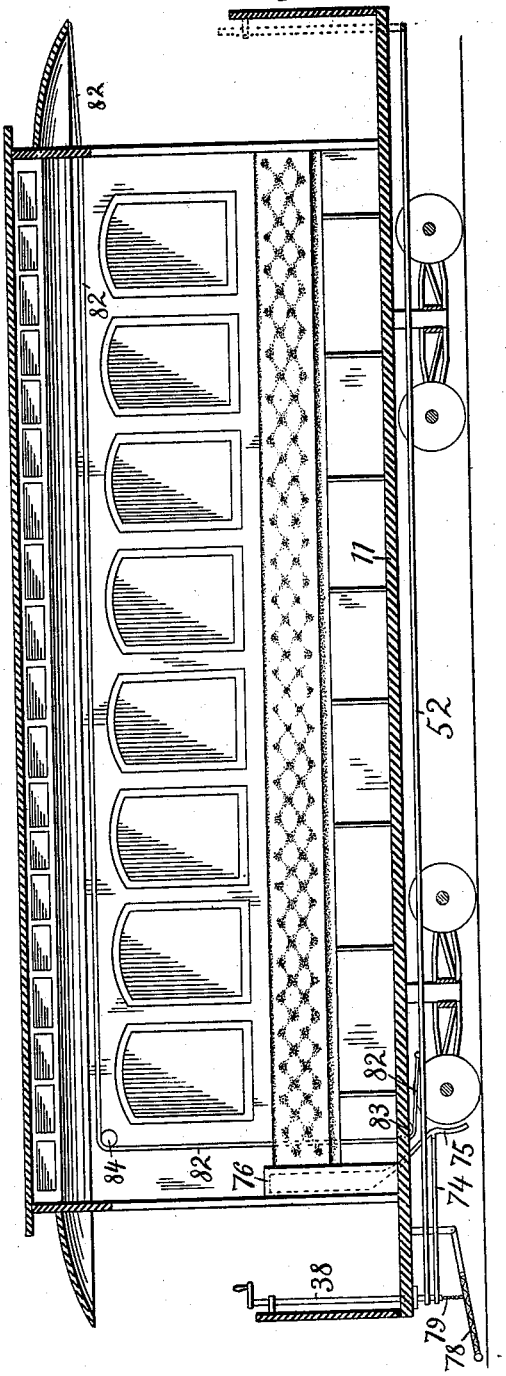
Witnesses
W. A. Alexander.
E. E. Vernell
Inventors
Geo. D. Brown
Given Campbell Jr
Greenfield Sluder
By Attorneys
Fowler & Fowler

UNITED STATES PATENT OFFICE.

GREENFIELD SLUDER, GIVEN CAMPBELL, JR., AND GEORGE D. BROWN, OF ST. LOUIS, MISSOURI.

LIQUEFIED-GAS BRAKE.

SPECIFICATION forming part of Letters Patent No. 568,214, dated September 22, 1896.

Application filed October 18, 1895. Serial No. 566,052. (No model.)

*To all whom it may concern:*

Be it known that we, GREENFIELD SLUDER, GIVEN CAMPBELL, Jr., and GEORGE D. BROWN, citizens of the United States, residing at the city of St. Louis, in the State of Missouri, have invented a certain new and useful Fluid-Pressure Brake, of which the following is such a full, clear, and exact description as will enable any one skilled in the art to which it appertains to make and use the same, reference being had to the accompanying drawings, forming part of this specification.

Our invention relates to a new and useful car-brake, and more particularly to a fluid-pressure brake.

The object of our invention is to provide a brake of the class named in which the pressure will be constant at all times, and the action of the brake thus rendered uniform and reliable.

The invention also has for its object to avoid the loss of speed occasioned by the pumping up of pressure in the ordinary fluid-pressure brake and to effect economy, efficiency, and convenience in fluid-pressure brakes, as well as to dispense with cumbersome storage-reservoirs of small capacity in such brakes.

Our invention consists in a novel brake mechanism employing liquid carbon dioxid, or other liquefied gas or compressed gas, to supply the pressure, and in certain details of construction, all of which are fully described in the following specification and pointed out in the claims affixed hereto.

Figure 1:
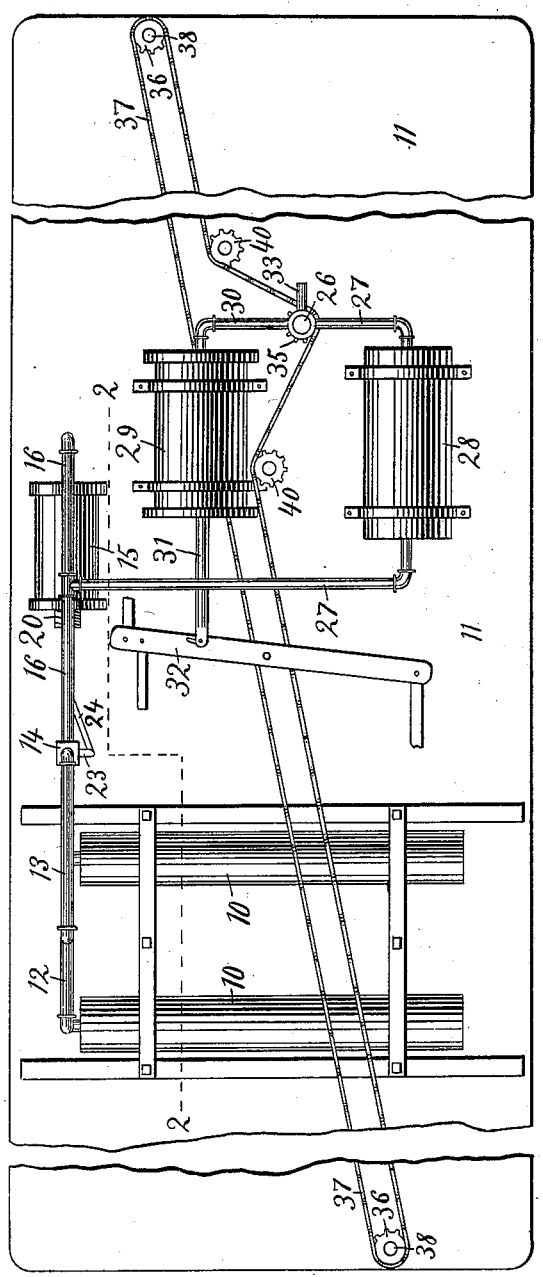
Figure 4:
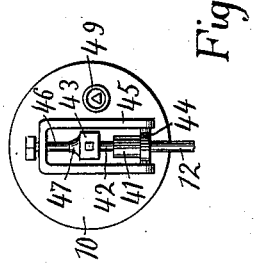
Figure 2:
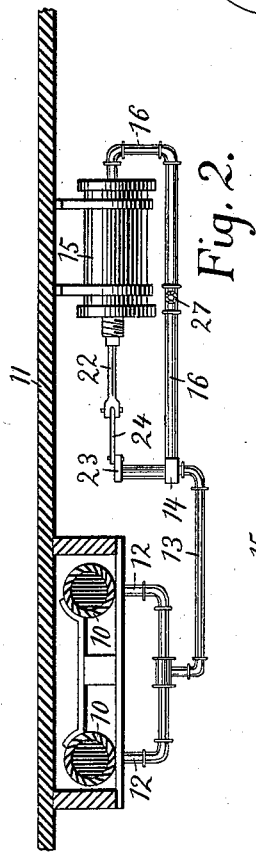
Figure 3:
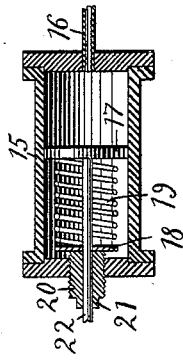

In the accompanying drawings, which illustrate one form of brake made in accordance with our invention attached to a street-railway car, Figure 1 is a bottom view. Fig. 2 is a section on the line 2 2 of Fig. 1. Fig. 3 is an enlarged section of the cylinder for controlling the pressure. Fig. 4 is an enlarged view of one of the devices for securing the pipes to the drums containing the liquefied gas. Fig. 5 is an enlarged vertical section of the device shown in Fig. 4. Fig. 6 is a view similar to Fig. 1, with the addition of devices for supplying additional pressure for an emergency stop. Fig. 7 is an enlarged top view of the valve-gearing shown in Fig. 6. Fig. 8 is an enlarged vertical section of the valve shown in Figs. 4 and 5. Fig. 9 is a longitudinal section of a car, showing how the sand-box and fender may be operated by our brake in making an emergency stop, and showing also connections whereby the conductor as well as the motorman may operate the brake. Fig. 10 is a front view of the dashboard of a car, the fender, and operating connections; and Fig. 11 is an enlarged bottom view showing the mechanism for operating the sand-box when making an emergency stop.

Like marks of reference refer to similar parts in the several views of the drawings.

10 are drums in which is contained the liquid carbon dioxid or other liquefied gas. They are removably secured in any suitable manner to the bottom of the car 11. From the drums 10 lead pipes 12, Figs. 1 and 2, which are connected together and communicate with a pipe 13, leading to a suitable seat-valve 14, substantially similar to the valve 43, Fig. 8, to be hereinafter described. Leading from the valve 14 to a pressure-regulating cylinder 15 is a pipe 16.

Situated between the piston 17, Fig. 3, of the cylinder 15 and a suitable disk 18 is a helical spring 19. Bearing against the disk 18 is a threaded plug 20, working in a suitably-threaded opening in the head of the cylinder 15. The outer end of the plug 20 has formed on it a squared part 21, by means of which it may be turned. The piston-rod 22 of the cylinder 15 passes through the disk 18 and plug 20 and is attached to a crank-arm 23 on the stem of the valve 14 by means of a connecting-link 24. The gas enters the cylinder 15 through the valve 14 and pipe 16 until the pressure is sufficient to overcome the resistance of the spring 19, when the supply is shut off by the action of the piston-rod 22 on the valve 14, thus regulating the pressure in the pipe 16. By screwing the plug 20 farther into the cylinder 15 the spring 19 is forced farther into the cylinder, and hence must be compressed to a greater extent before the gas is shut off, and thus a higher pressure is maintained in the pipe 16. By reversing the operation a lower pressure may be obtained in the pipe 16. This regulation can also be effected by using springs 19 of different or varying strength.

Leading from the pipe 16 to a three-way valve 26 is a pipe 27. As the gas passes comparatively slowly through the valve 14, an auxiliary drum 28, in which the gas collects, is interposed in the pipe 27. Leading from the valve 26 to a brake-cylinder 29 is a pipe 30. The brake-cylinder 29 is of the usual construction, and its piston-rod 31 is connected to the equalizer 32, and thus operates the brake-shoes. 33 is the escape or exhaust pipe of the valve 26. To the plug of the valve 26 is secured a sprocket-wheel 35. Around the sprocket-wheel 35 and two sprocket-wheels 36, secured to the lower ends of the rods 38 to which the brake-handles are attached, passes a sprocket-chain 37, and the brake is thus operated from the brake-handles. 40 are two idle-wheels for keeping the sprocket-chain 37 taut around the sprocket-wheel 35. Other means for operating the valve 26 may be employed without departing from our invention.

The device for securing the pipes 12, which are permanently attached to the bottom of the car, to the removable drums 10 is illustrated in Figs. 4 and 5. The pipe 12 is provided with an enlarged portion 41, the opening through which is enlarged at the upper end to receive the nipple 42 of a seat-valve 43, Fig. 8, which communicates with and is carried by the drum 10. Around the enlarged portion 41 is secured a collar 44, which is pivoted in a U-shaped part 45, carried by the pipes 12. Through the top of the U-shaped part 45 passes a threaded bolt 46, on the lower end of which is carried a loosely-mounted cap 47, which bears against the upper face of the valve 43. At the lower end of the nipple 42 is a washer or gasket 48, Fig. 5, of rubber or other suitable material.

49 is a safety-valve on the tank containing the liquid gas. By this construction a very tight joint is readily made between the pipe 12 and drum 10, and at the same time a drum when empty may be readily disconnected and replaced by a full one. To connect the pipe 12 with the drum 10, the nipple 42 of the valve 43 is placed in the opening of the enlarged portion 41. The cap 47 is then placed on the top of the valve 43, and the bolt 46, carrying said cap, is screwed firmly down, thus drawing the enlarged portion 41 of the pipe 12 tightly against the nipple 42 and forming a secure joint. The valve 43, Fig. 8, is of the type known as "seat-valves," in which a stem 50, provided with a suitable beveled or rounded end, seats and unseats by screwing the stem 50 in or out.

Fig. 6 illustrates the brake with the addition of devices for effecting an emergency stop. The parts used for the service stop in this mechanism are like those shown in Fig. 1, except that the sprocket-wheel 35 on the valve 26 is replaced by a pinion-wheel 51, which engages with a toothed rack 52. The remaining parts used for the service stop have the same marks of reference as in Fig. 1. 53 is an additional drum for containing liquefied gas, similar to the drums 10. Leading from the drum 53 to a pressure-regulating cylinder 54 is a pipe 55. The pressure-regulating cylinder 54 is like the pressure-regulating cylinder 15, except that it is set to maintain a much higher pressure and also to work more rapidly. Leading from a pipe 56, in which the pressure is regulated by the pressure-regulating cylinder 54, to a suitable seat-valve 57 is a pipe 58. The valve 57 is similar to the valve 43. (Shown in Fig. 8.) We prefer to use a valve of this construction in this place, because with the comparatively high pressure in the pipe 58 a plug-valve is found to leak considerably. A pipe 59 connects the valve 57 with the pipe 30, leading to the brake-cylinder 29. On the stem of the valve 57 is a pinion-wheel 60, which engages with the toothed rack 52. The rack 52 is provided with a series of teeth 61, which engages the pinion-wheel 51, and a second series of teeth 62, which engages with the pinion-wheel 60. The distance between these two series of teeth is such that when the rack 52 is moved to set the brake the series 62 will come into engagement with the pinion-wheel 60 just as the series 61 goes out of engagement with the wheel 51. The rack 52 is carried in suitable guides or brackets 63, secured to the bottom of the car 11. To each end of the rack 52 is secured a rod 64, (only one of which is shown,) which is attached to a suitable system of levers 65, carried by the rod 38, to which is attached the brake-handle.

When our brake is used on an electrically-propelled car, the electric power may be shut off when the brake is set for an emergency stop without the use of an additional movement by providing the brake-rod 38 with an arm 67, Fig. 6, which makes contact with a plate 68. To the plate 68 is secured a wire 69, in electrical communication with the trolley, and from the arm 67 a wire 70 passes to the motor. The length of the plate 68 is such that the arm 67 will bear upon it when the brake-handle is in its normal position and in position for a service stop or any intermediate position; but when the brake-handle is turned for an emergency stop the arm 67 will be carried past the plate 38, and the electric current will thus be interrupted. For service stops the current may be cut off by a separate lever in the usual manner.

In order to supply sand to the track when the brake is set for an emergency stop, the rod 38 is provided with an arm 71, Fig. 11, in which is formed a curved slot 72. Into the slot 72 projects a pin 73, carried on a bar 74, leading to the pipe 75, Fig. 9, of the sand-box 76 and opening and closing it in the usual manner. The slot 72 allows the arm 71 to move through the arc incidental to setting the brake for a service stop without moving the bar 74; but the further movement of the arm 71, caused by setting the brake for an emergency stop, brings the end of the slot 72 in contact with the pin 73, and this moves the bar 74 to open the pipe 75 and allow the escape of sand on the track.

To accomplish the lowering of the fender 78, Figs. 9 and 10, into position for use at the same time that the brake is set for an emergency stop, a chain 79 is provided. One end of the said chain is attached to the fender 78 and the other to the rod 38. The fender 78 is raised to its normal position and one of the links of the chain slipped over an L-shaped hook 80, Fig. 10. The length of the chain is such that in this position there will be just sufficient slack in the chain between the hook 80 and the rod 38 to allow of the partial rotation of the said rod to set the brake for service stops without drawing the chain off the hook 80, so that a further rotation of the rod 38 to set the brake for an emergency stop will draw the chain from the hook and allow the fender to drop into position for use.

In order that the brake may be set from any part of the car, we provide a rope or cord 82, Fig. 9, which is attached to the bar 52. For want of space the brake mechanism proper is not shown in Fig. 9 but it will be understood that the fluid-pressure brake mechanism is operated by the bar 52 in the manner previously described. The cord 82 passes around a pulley 83 in the bottom of the car and a pulley 84 near the top of the car, from where it is led to the rear end of the car and secured. By pulling this rope the bar 52 is moved in the direction to set the brake.

Having now more particular reference to Fig. 1, the operation of our invention is as follows: The drums 10 are filled with liquefied gas and attached to the pipes 12 in the manner heretofore described. Carbon dioxid liquefies at a pressure of about thirty-six atmospheres at a temperature of zero degrees centigrade. As soon as any of the gas is allowed to escape a part of the remaining liquefied gas in the drums volatilizes and keeps the pressure constant in the drum and is sufficient to maintain the remaining gas in a liquid form, so that the pressure is uniform as long as any liquid remains in the drum. Preferably only one of the drums 10 is brought into requisition at a time, so that when one drum becomes exhausted the remaining full one can be called into service and the empty one replaced by a full one at convenience. The liquefied gas passes through the pipes 12 and 13 to the valve 14, where it expands into gas and passes to the pressure-regulating cylinder 15, which controls the valve 14, and thus the pressure is reduced and flows into and fills the auxiliary drum 28. When it is desired to set the brakes, the brake-handle is moved and motion imparted by the sprocket-chain 37 to the valve 26, so that the gas in the auxiliary drum 28 is allowed to flow into the brake-cylinder 29 to set the brakes. To release the brakes, the brake-handle is moved in the opposite direction, and the communication between the drum 28 and the brake-cylinder thus closed and connection between the brake-cylinder 29 and the exhaust-pipe 33 opened, Fig. 7, so that the gas can exhaust from the brake-cylinder.

When the emergency device, as shown in Fig. 6, is used, the brake-handle is moved until the valve 26 is turned so as to open communication between the auxiliary drum 28 and the brake-cylinder. In this position the brake is applied for the ordinary service stop. If, however, it is desired to apply the brake for an emergency stop, the brake-handle is moved still farther in the same direction, whereby the plug-valve 26 is turned slightly farther so as to shut off the pipe 30 from communication with both the pipes 27 and 33, Figs. 6 and 7, and thus cuts off communication established between the auxiliary drum 28 and the brake-cylinder, and the valve 57 is now opened. As soon as the valve 57 is opened gas under much higher pressure flows through the pipe 59 into the already full brake-cylinder 29 and thus sets the brake with greater force for an emergency stop. At the same time the electric power is cut off by the arm 67 moving out of contact with the plate 68. Sand is applied to the brake by the movement of the bar 74 and the fender lowered by the withdrawal of the chain 79 from the hook 80. Thus the confusion and loss of time which are incident to the accomplishment of each of these results by a separate movement of each are avoided. When it is desired to release the brakes, the brake-handle is turned in the opposite direction, which first closes the valve 57 and then opens communication between the pipe 30 and the exhaust-pipe 33, so that the gas exhausts from the brake-cylinder 29.

We are aware that it has been proposed to use liquid carbon dioxid to operate motors, but this has not proved practicable, as liquefied gas, when called into requisition with frequency, as it must be when used for such purpose, freezes, and the motor will not operate. In our invention the liquefied gas is used but intermittently and infrequently and does not freeze. We have constructed a brake mechanism after our invention and used it with great success on electric street-cars.

By the absolutely uniformly high pressure which is obtained by the use of liquefied gas a great advantage is gained in the uniformity and efficiency of the brake, both for service and emergency stops. In service stops the brakes are always set with absolutely the same force and the car stopped at a known predetermined distance and with the greatest precision at any required place, while for emergency stops, the high pressure being always maintained, the car is invariably stopped in the shortest possible time. In our brake the pressure is maintained absolutely uniform under all operative conditions, and no motor of any sort is relied upon in an attempt to maintain the fluid-pressure constant.

Having fully described our invention, what we claim as new, and desire to secure by Letters Patent of the United States, is—

1. In a fluid-pressure brake mechanism, a reservoir containing liquefied gas, a brake-cylinder, pipe connections between said reservoir and brake-cylinder, a pressure-reducing device interposed in said pipe connections, a valve also interposed in said pipe connections between the reducing-valve and brake-cylinder, and means for operating said valve.

2. In a fluid-pressure brake mechanism, a reservoir containing liquefied gas, a brake-cylinder, pipe connections between said reservoir and cylinder, a valve interposed in said pipe connections, a pressure-reducing device interposed in said pipe connections between said valve and reservoir, an auxiliary reservoir, and means for operating said valve.

3. In a fluid-pressure brake mechanism, a reservoir containing liquefied gas, a brake-cylinder, pipe connections between said reservoir and cylinder, a valve interposed in said pipe connections, a pressure-reducing device interposed in said pipe connections between said valve and reservoir, an auxiliary reservoir interposed in said pipe connections between said pressure-reducing device and said valve, and means for operating said valve.

4. In a fluid-pressure brake mechanism, a reservoir containing liquefied gas, a brake-cylinder, pipe connections between said reservoir and brake-cylinder, a pressure-reducing device interposed in said pipe connections, means for varying the reduction in pressure accomplished by said pressure-reducing device, a valve interposed in said pipe connections between said brake-cylinder and reservoir, and means for operating said valve.

5. In a fluid-pressure brake mechanism, a reservoir containing liquefied gas, a brake-cylinder, pipe connections between said reservoir and brake-cylinder, a valve interposed in said pipe connections, means for operating said valve, a second liquefied-gas reservoir for delivering gas to the cylinder at a different pressure from the first reservoir, pipe connections between said brake-cylinder and said second reservoir, a valve in said latter pipe connections, and means for operating said latter valve.

6. In a fluid-pressure brake mechanism, a reservoir containing liquefied gas, a brake-cylinder, pipes connecting said reservoir and brake-cylinder, a pressure-reducing device interposed in said pipes, a valve interposed in said pipes, means for operating said valve, a second reservoir containing liquefied gas, pipes connecting said second reservoir with said brake-cylinder, a pressure-reducing device interposed in said latter pipes, said pressure-reducing device maintaining a different pressure from the first-named pressure-reducing device, a valve interposed in said latter pipes, and means for operating said latter valve.

7. In a fluid-pressure brake mechanism, a reservoir containing liquefied gas, a brake-cylinder, pipes connecting said reservoir and brake-cylinder, an auxiliary reservoir interposed in said pipes, a pressure-reducing device also interposed in said pipes, a valve in said pipes, a second reservoir containing liquefied gas, pipes connecting said second reservoir and said brake-cylinder, a valve in said latter pipes, and connections for operating said valves, whereby the oversetting of the first-mentioned valve will close the communication between said first-named reservoir and said brake-cylinder and open that between the said second reservoir and said brake-cylinder.

8. In a fluid-pressure brake mechanism, a pressure-containing reservoir, a brake-cylinder, pipe connections between said reservoir and brake-cylinder, a valve interposed in said pipe connections, means for operating said valve, a second pressure-containing reservoir for delivering fluid to said brake-cylinder at a higher pressure than the said first-named reservoir, connections between said second reservoir and brake-cylinder, a valve in said connections, means for operating said latter valve, and means for interrupting the supply of power to the motor propelling the car simultaneously with the opening of said second valve.

9. In a fluid-pressure brake mechanism, a brake-cylinder, a main pressure-containing reservoir for service stops, adapted to communicate with said brake-cylinder, a second pressure-containing reservoir for emergency stops also adapted to communicate with said brake-cylinder, means for controlling the admission of pressure from said reservoir to said brake-cylinder, and connections whereby the supply of power is cut off from the motor propelling the car by the opening of the communication between said emergency-reservoir and said brake-cylinder.

10. In a fluid-pressure brake mechanism, a brake-cylinder, a pressure-containing reservoir adapted to communicate therewith, a second pressure-containing reservoir for emergency stops also adapted to communicate with said brake-cylinder, means for controlling the admission of pressure from said reservoirs to said brake-cylinder, a suitable sand-box, and connections whereby said sand-box is opened by the opening of the connections between said emergency-reservoir and said brake-cylinder.

11. In a fluid-pressure brake mechanism, a brake-cylinder, a pressure-containing reservoir adapted to communicate therewith, a second pressure-containing reservoir for emergency stops also adapted to communicate with said brake-cylinder, means for controlling the admission of pressure from said reservoirs to said brake-cylinder, a suitable fender, and means for lowering said fender by the opening of the connections between said emergency-reservoir and said brake-cylinder.

12. In a fluid-pressure brake mechanism, a pressure-containing reservoir, a brake-cylinder, pipe connections between said reservoir and brake-cylinder, an automatic pressure-reducing device for maintaining constant the pressure in said pipe connections, a valve for controlling the admission of pressure to said brake-cylinder, and means for governing said valve.

13. In a fluid-pressure brake mechanism, a pressure-containing reservoir, a brake-cylinder, pipe connections between said reservoir and brake-cylinder, a pressure-reducing device interposed in said pipe connections, said pressure-reducing device consisting of a valve, a cylinder and a piston operating to close said valve at a predetermined pressure, a valve for controlling the admission of pressure to said brake-cylinder, and means for governing said latter valve.

14. In a fluid-pressure brake mechanism, a pressure-containing reservoir, a valve governing the flow of pressure from the same, a cylinder containing a suitable piston, pipe connections between said valve and cylinder, connections between the piston of said cylinder and the stem of said valve, whereby the movement of said piston will operate said valve, said valve, cylinder and the connections between them forming a pressure-reducing device, a brake-cylinder, pipe connections between said pressure-reducing device and brake-cylinder, a valve for controlling the admission of pressure to said brake-cylinder, and means for governing said latter valve.

15. In a fluid-pressure brake mechanism, a pressure-containing reservoir, a cylinder, pipe connections between said reservoir and cylinder, a valve interposed in said pipe connections, a piston in said cylinder, a spring interposed between said piston and the head of said cylinder, connections between said piston and said valve, whereby said valve is operated by the movement of said piston, said valve, cylinder and the connections between them constituting a pressure-reducing device, a brake-cylinder, pipe connections between said pressure-reducing device and brake-cylinder, and means for controlling the admission of pressure to said brake-cylinder.

16. In a fluid-pressure brake mechanism, a pressure-containing reservoir, a cylinder, pipe connections between said reservoir and cylinder, a valve interposed in said connections, a piston in said cylinder, connections between said piston and the stem of said valve, whereby the movement of said piston operates said valve, a spring interposed between said piston and the head of said cylinder, means for varying the position of said spring and thereby the pressure at which said valve is closed by said piston, said valve, cylinder and the connections between them constituting a pressure-reducing device, and a brake-cylinder adapted to be put in communication with said pressure-reducing device.

17. In a fluid-pressure brake mechanism, a brake-cylinder, a main reservoir containing liquefied gas for service stops, a second reservoir containing liquefied gas for emergency stops, pipe connections between each of said reservoirs and said brake-cylinder, valves in said pipe connections, and means for opening or closing said valves successively by a single movement of the brake-handle.

18. In a fluid-pressure brake mechanism, a brake-cylinder, a main pressure-containing reservoir for service stops, pipe connections between said reservoir and brake-cylinder, a second pressure-containing reservoir for emergency stops, pipe connections between said latter reservoir and said brake-cylinder, a valve in each of said pipe connections, a pinion-wheel carried by each of said valves, and a toothed rack adapted to engage successively with said pinion-wheels and thereby operate said valves.

In testimony whereof we have hereunto set our hands and affixed our seals in the presence of the two subscribing witnesses.

GREENFIELD SLUDER. [L. S.]
      GIVEN CAMPBELL, JR. [L. S.]
      GEORGE D. BROWN. [L. S.]

Witnesses:
  A. C. FOWLER,
  JOHN F. GREEN.